United States Patent [19]
Vollmer et al.

[11] Patent Number: 5,786,647
[45] Date of Patent: Jul. 28, 1998

[54] DEVICE FOR INCORPORATING A MOTOR

[75] Inventors: Thomas Vollmer, Bühl; Michael Hanek, Renchen; Gerhard Gross, Lauf; Ralf-Michael Schneider, Baden-Baden; Albert Van Wijhe, Bühlertal; Wolfgang Frank, Bühl, all of Germany

[73] Assignee: Robert Bosch GmbH, Stuttgart, Germany

[21] Appl. No.: 335,835

[22] PCT Filed: Mar. 4, 1994

[86] PCT No.: PCT/DE94/00271

§ 371 Date: Nov. 2, 1994

§ 102(e) Date: Nov. 2, 1994

[87] PCT Pub. No.: WO94/21025

PCT Pub. Date: Sep. 15, 1994

[30] Foreign Application Priority Data

Mar. 4, 1993 [DE] Germany ............... 9303162 U
Oct. 7, 1993 [DE] Germany ............... 43 34 124.1

[51] Int. Cl.⁶ ............... H02K 5/00; H02K 5/24
[52] U.S. Cl. ............... 310/89; 310/51; 310/91
[58] Field of Search ............... 415/119; 417/354; 310/89, 62, 63, 51, 91

[56] References Cited

U.S. PATENT DOCUMENTS

| | | | |
|---|---|---|---|
| 2,776,088 | 1/1957 | Wentling | 417/354 |
| 2,830,752 | 4/1958 | Wentling | 417/354 |
| 3,114,060 | 12/1963 | Goettl | 310/51 |
| 3,143,284 | 8/1964 | Lidsjo et al. | 310/51 |
| 3,323,763 | 6/1967 | Butts | 310/89 |
| 3,500,084 | 3/1970 | Ito et al. | 310/51 |
| 4,167,376 | 9/1979 | Papst | 417/354 |
| 4,508,486 | 4/1985 | Tinker | 415/119 |
| 4,663,549 | 5/1987 | Suzuki | 310/62 |
| 4,750,860 | 6/1988 | Kelley | 415/119 |
| 4,780,052 | 10/1988 | Pradelle | 415/119 |
| 5,030,068 | 7/1991 | Jacobs et al. | 417/363 |
| 5,049,770 | 9/1991 | Gaeth et al. | 310/89 |
| 5,210,453 | 5/1993 | Nelson | 310/51 |
| 5,281,106 | 1/1994 | Reinhardt et al. | 417/354 |
| 5,397,950 | 3/1995 | Norbury, Jr. et al. | 310/91 |

*Primary Examiner*—Steven L. Stephan
*Assistant Examiner*—Michael J. Wallace, Jr.
*Attorney, Agent, or Firm*—Michael J. Striker

[57] ABSTRACT

A device is proposed for holding an electric motor which has a tubular housing portion enclosing the motor armature and supports which are associated with the motor housing are arranged at the end sides of the housing portion for the arrangement of bearings for the motor shaft. The motor is held in such a way that vibrations are minimized and noise is damped in that at least one resilient damping member is arranged between the inner walls of the holding device and the outer walls of the motor housing facing these inner walls. The damping member is supported at the walls of the holding device and motor housing which face one another.

19 Claims, 8 Drawing Sheets

DEVICE FOR INCORPORATING A MOTOR

PRIOR ART

The invention is directed to a device for holding a motor of the generic type indicated in the main claim which is directly and securely connected with a supporting part. When used in connection with an air guidance shaft associated with an air-conditioning system of a motor vehicle, for example, the vibrations of the fan motor are transmitted to this motor receptacle resulting in undesirable noise.

ADVANTAGES OF THE INVENTION

The motor holding device according to the invention with the characterizing features of the main claim has the advantage over the prior art that the damping members eliminate motor vibrations which can cause annoying noise.

Advantageous further developments and improvements of the motor holding device indicated in the main claim are made possible by the steps contained in the subclaims.

DRAWING

Embodiment examples of the invention are shown in the drawing and explained more fully in the following description.

DESCRIPTION OF THE EMBODIMENT EXAMPLES

Figure 1:
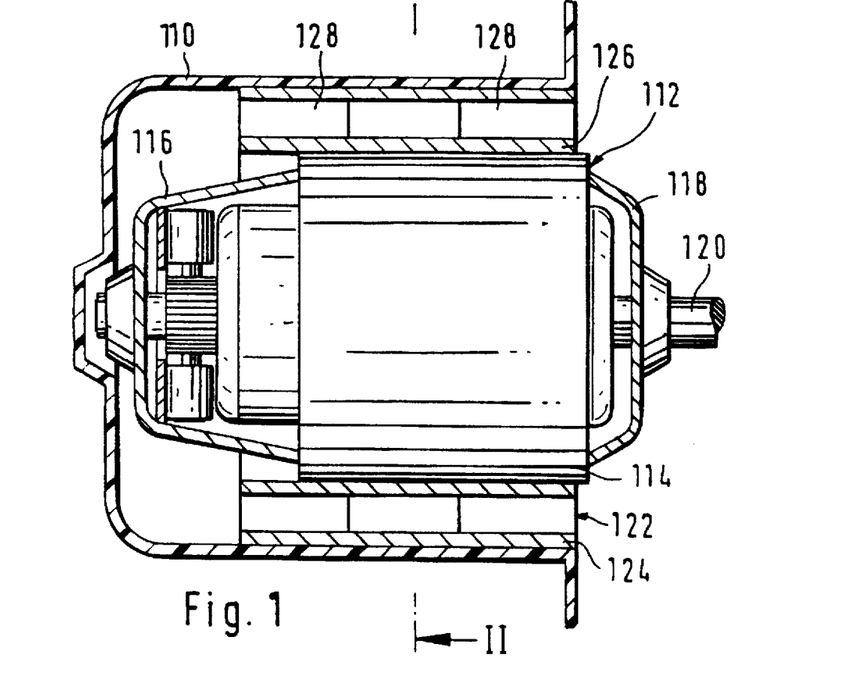
FIG. 1 shows a longitudinal section through a holding pot in which the electric motor is arranged.
Figure 2:
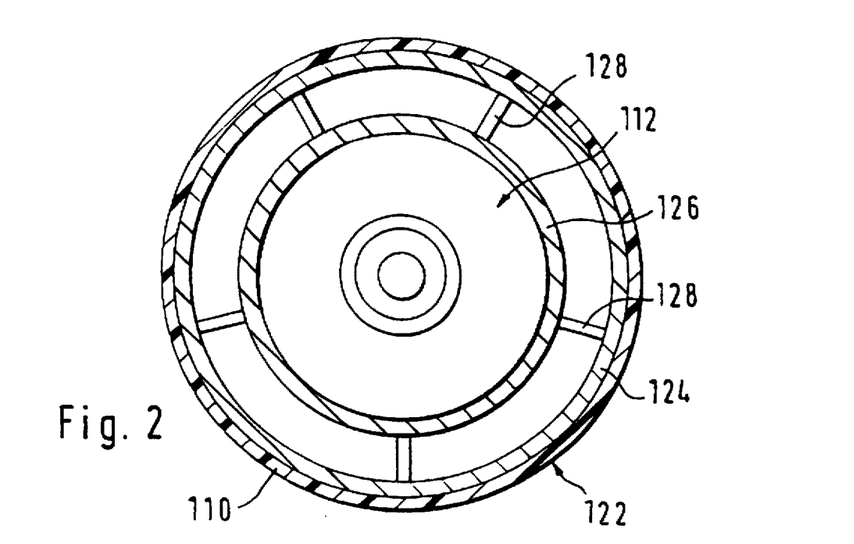
FIG. 2 shows a side view of the electric motor according to FIG. 1, which motor is enclosed by a tubular damping member shown in section.

An electric motor 112 is accommodated in a pot-shaped receptacle 110 which is shown in longitudinal section in FIG. 1. The electric motor 112 has a tubular housing portion 114 which encloses the motor armature. Supports 116 and 118 associated with the motor housing are arranged at the two end sides of the housing portion 114. The supports 116 and 118 serve to receive bearings for the shaft 120 of the electric motor 112. The diameter of the holding pot 110 is greater than the diameter of the tubular housing portion 114. A damping member 122 manufactured from resilient material is arranged between opposite walls, i.e., the inner wall of the pot 110 and the outer surface area of the tubular housing portion 114. The damping member 122 is tubular. As is shown in FIG. 2, it fits around the tubular housing portion 114 of the electric motor 112 so as to enclose it. It is constructed as a double pipe so that the outer pipe 124 contacts the inner wall of the pot 110 and the inner pipe 126 encloses the tubular housing portion 114 of the electric motor 112. As is shown particularly in FIG. 2, these two pipe parts 124 and 126 of the damping member 122 are arranged at a distance from one another. They are connected with one another by a plurality of web-like connection pieces 128. As will be seen from FIG. 1, the connection webs 128 extend from the end sides of the damping member 122 so as to be approximately parallel to the pipe axis of the damping member 122. The webs 128 are shorter than half the length of the double pipe 122 as viewed in the direction of this pipe axis. Both the outer pipe 124 and inner pipe 126 are made of a material which is harder than the connection webs 128 so as to achieve an especially favorable damping effect. The damping effect is enhanced as a result of this step and by arranging the damping webs 128 at a distance from one another in the longitudinal direction of the pipe axis.

Figure 3:
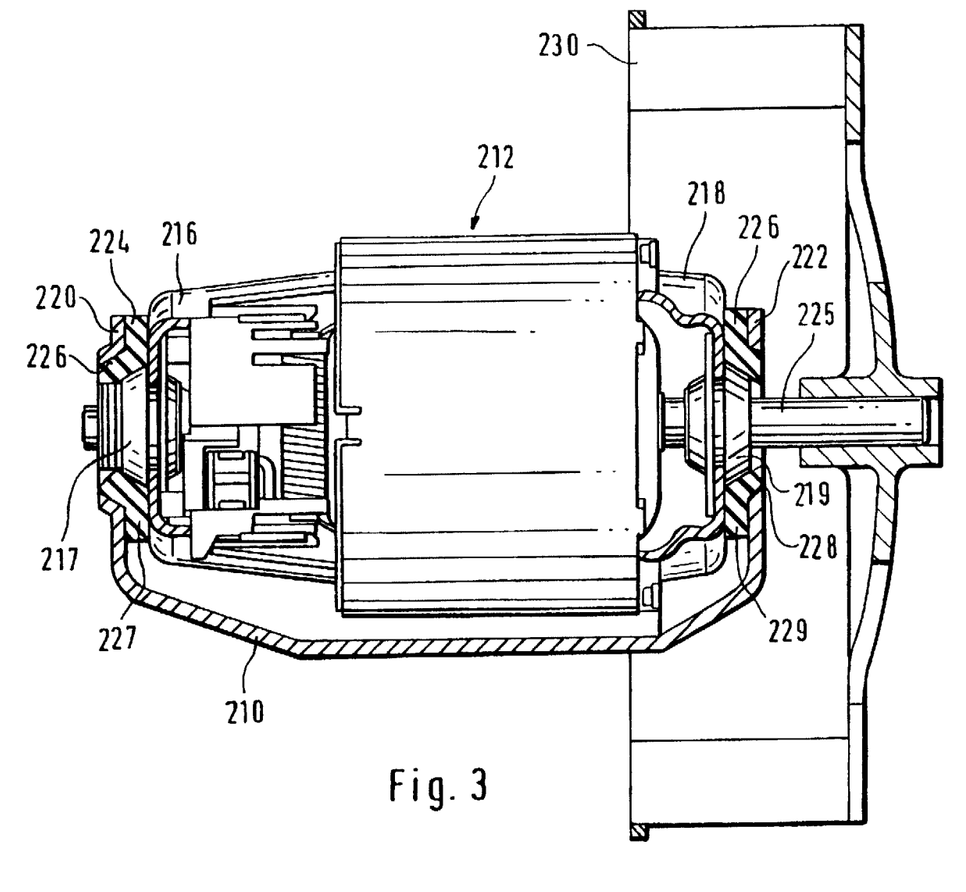
FIG. 3 shows a longitudinal section through another holding device for a fan motor.

In the embodiment form shown in FIG. 3, the holding device 210 is constructed in the shape of a trough. As seen in the longitudinal direction of the rotational axis of the motor, the holding device 210 has two walls 220 and 222 which lie parallel to the end plates 216 and 218 serving as bearing supports. Since the motor holding device 210 is longer than the electric motor 212 as viewed in the direction of the rotational axis of the motor, there are spaces between the supports 216, 218 and the walls 220 and 222 of the holding device 210 associated with the latter in which damping members 224 and 226 are accommodated. As can also be seen from FIG. 3, the damping members 224, 226 enclose cone-shaped bulges 217, 219 of the supports 216, 218 which serve, in turn, to receive the bearing members for the motor shaft 225. These conical bulges 217, 219 serve to correctly center the correspondingly constructed damping members 224, 226. The outer side of the damping members 224, 226 sits in conical recesses 226, 228 of the holding device 210. Such an arrangement of the damping members has the advantage that they lie far apart in the vicinity of the bearings of the electric motor, which particularly benefits the suppression of torsional vibrations at very low frequencies without increasing the tendency of the electric motor 212 to wobble in the holding device 210. In addition to the conical portion mentioned above, the damping members 224 and 226 have an annular flange 227 and 229, respectively, which extends outward radially and is connected with the conical portion at the base of the cone. As is also shown in FIG. 3, the electric motor 212 is constructed as a so-called fan motor having a fan wheel 230 mounted on its motor shaft 225.

In both of these embodiment forms, resilient damping members are arranged between the inner walls of the holding device and the outer walls of the motor housing facing these inner walls. The damping members are supported at the facing walls of the holding device of the motor housing which are arranged at a distance from one another in the direction of the rotational axis of the motor. In this way, the vibrations and accordingly the undesirable operating noise of the fan are adequately damped. As a result of the maximum distance between the receiving or holding points which is achieved by accommodating the fan motor in the vicinity of the bearings of its armature shaft, the tangential adaption of the fan motor can be carried out very smoothly.

Figure 4:
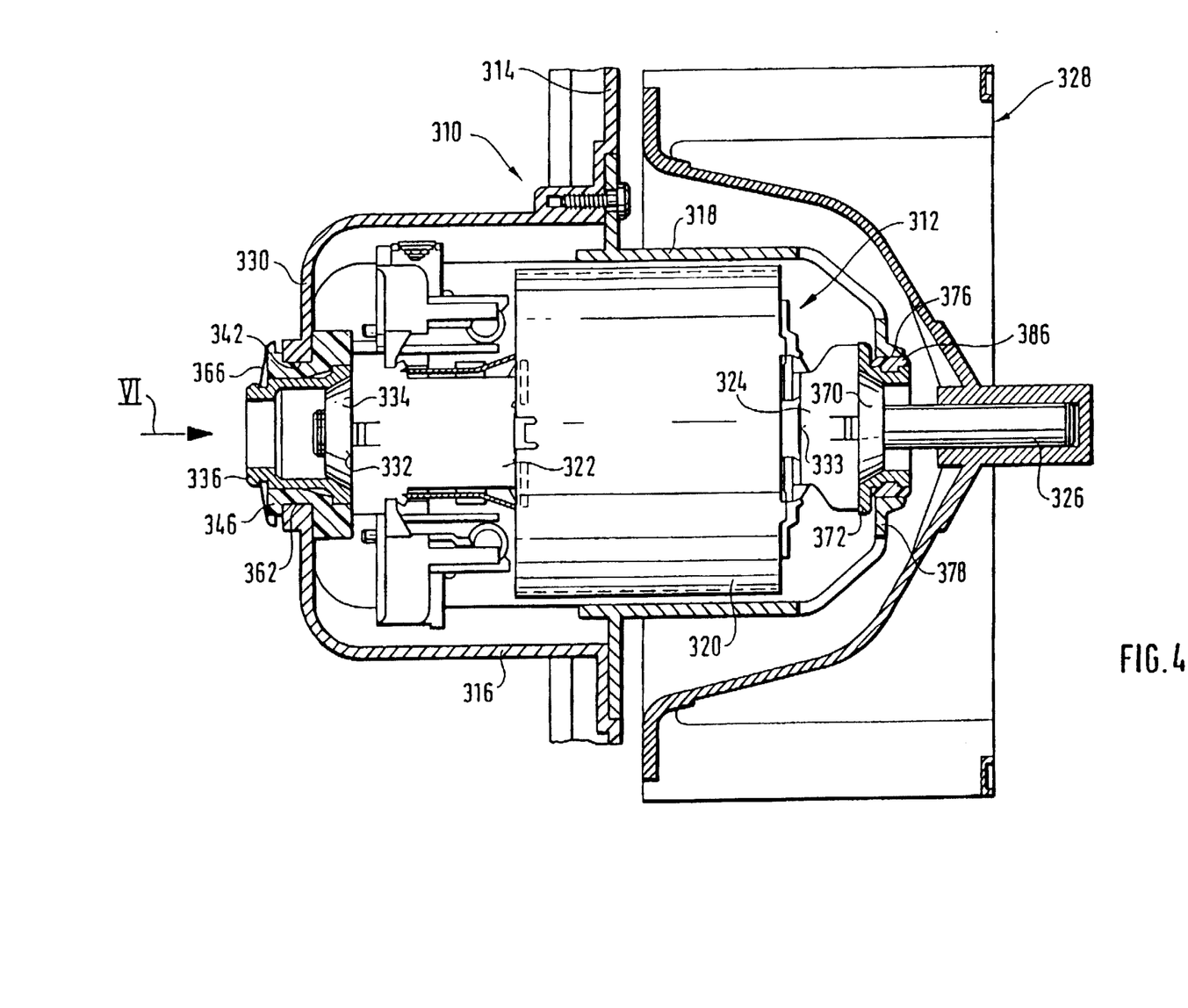
FIG. 4 shows a longitudinal section through another embodiment form of a holding device for a fan motor.
Figure 5:
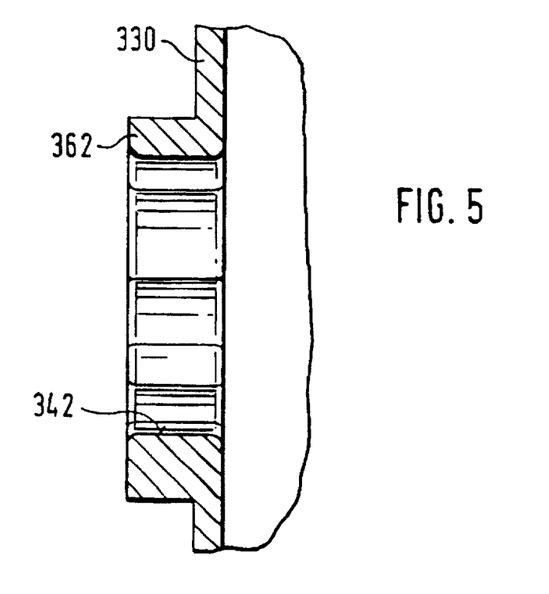
FIG. 5 shows a section along line V—V in FIG. 6.
Figure 6:
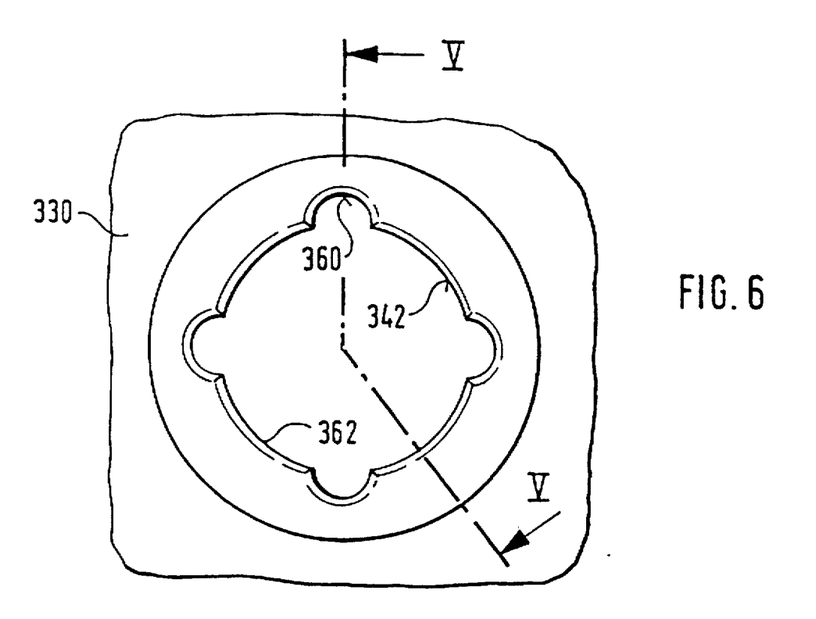
FIG. 6 shows a partial section in the direction of arrow VI of a holding pot associated with the holding device shown in FIG. 4 in enlarged scale.
Figure 7:
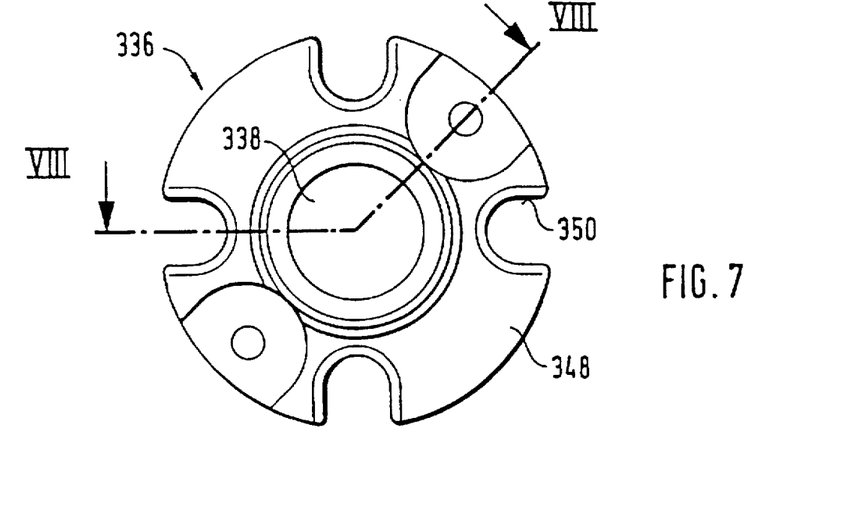
FIG. 7 shows a top view of a centering sleeve seated in the holding pot according to FIG. 4 in enlarged scale.
Figure 8:
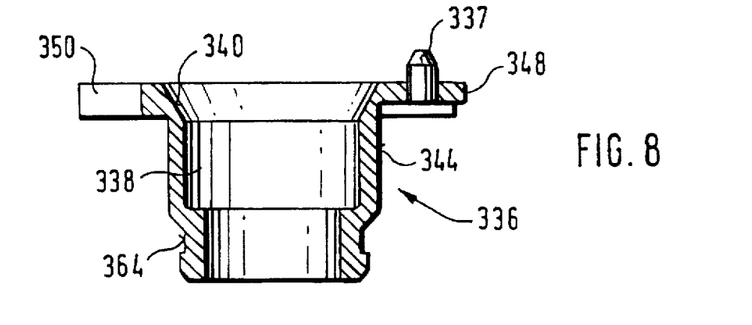
FIG. 8 shows a section through the centering sleeve along line VIII—VIII.
Figure 9:
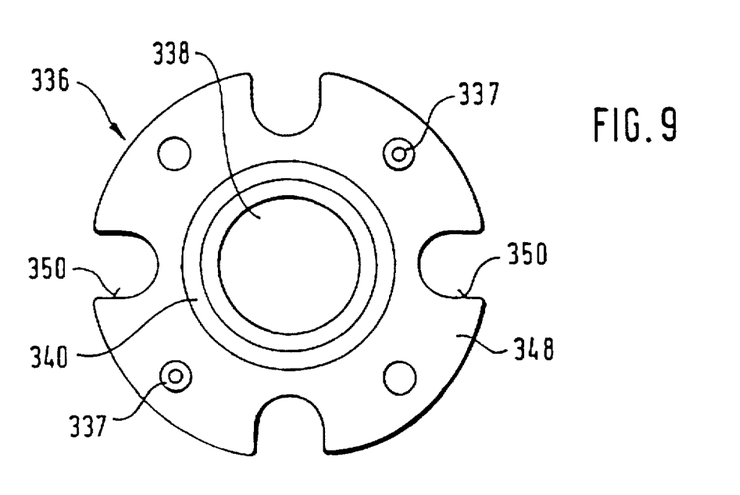
FIG. 9 shows a bottom view of the centering sleeve.
Figure 10:
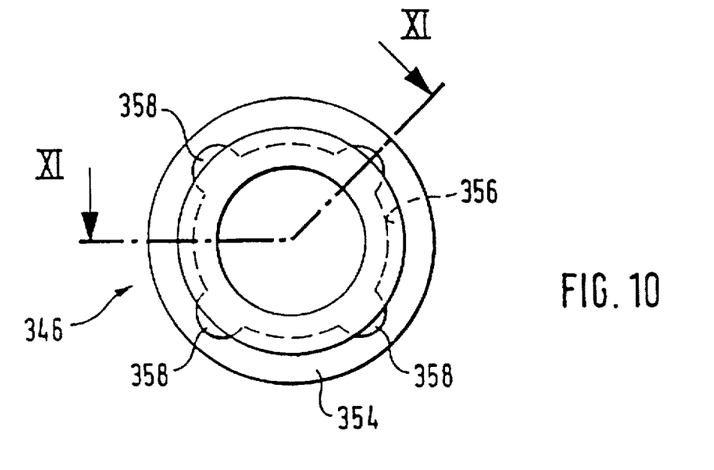
FIG. 10 shows a top view of a damping bush according to FIG. 4 in enlarged scale.
Figure 11:
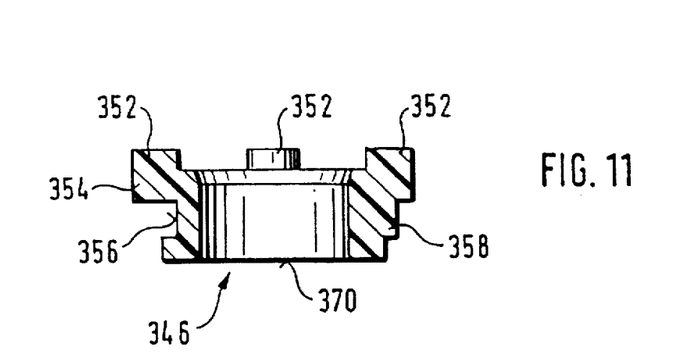
FIG. 11 shows a section through the damping bush along line XI—XI.
Figure 12:
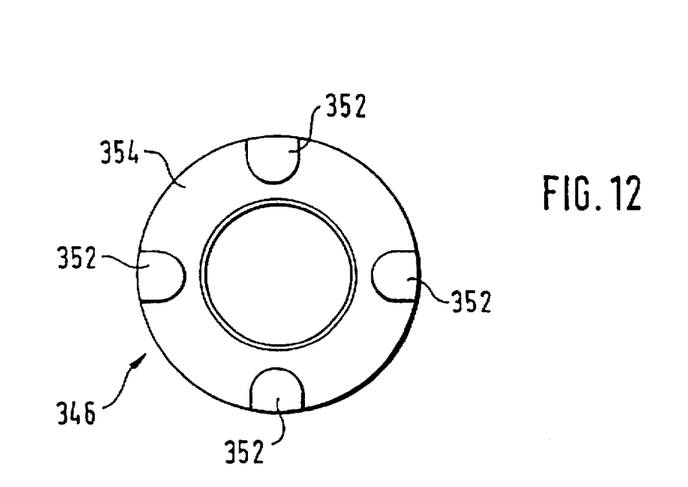
FIG. 12 shows a bottom view of the damping bush.

Another device 310 for receiving an electric motor 312 shown in FIG. 4 has a wall 314 forming a part of a wall (not shown) of an air guidance duct which is part of the air-conditioning system of a motor vehicle. The holding device includes a holding pot 316 and a supporting cup 318, both of which are securely connected with the wall 314. The electric motor 312 has a retaining sleeve 320 associated with the motor housing. A bearing bracket 322 and 324 is arranged at the two ends of the retaining sleeve 320. Bearing bracket 322 is located on the commutator side of the electric motor 312. The other bearing bracket 324 is penetrated by a prolongation 326 of the motor armature shaft and accordingly projects into the air guidance duct. The prolongation 326 carries a fan wheel 328 which aids the throughput of air in the air guidance duct when the electric motor 312 is activated. The holding pot 316 extends from the wall 314 over the bearing bracket 322 in such a way that the base 330 of the holding pot 316 is located at a distance from the exposed end of the bearing bracket 322. A protuberance 334 having the shape of a truncated cone in cross section is provided at the end face 332 of the bearing bracket 322, its outer surface area serving to hold the electric motor 312. For this purpose, a sleeve 336 is fastened to the end face 322 of the bearing bracket 322, although it actually makes up a part of the base 330 of the pot. The sleeve has a conical depression 340 at its central bore hole 338. This conical depression 340 is adapted to the shape of the protuberance 334 in such a way that the depression forms a holder for the electric motor 312. The sleeve 336 extends from the end face 332 of the electric motor 312 through a recess 342 of the pot base 330. It has a cylindrical portion 344 at its outer surface area. A damping bush 346 made of resilient material is arranged on this cylindrical portion 344. FIGS. 7 to 12 show design details of the sleeve 336 and damping bush 346. The sleeve 336 is provided with an annular flange 348 at one end. The front end face of the annular flange 348 contacts the end face 332 of the electric motor in the assembled state and is connected with it. In the embodiment example it is provided with four cut out portions 350 which are open at the edge. Axial projections 352 which are arranged at an annular wall 354 arranged at the damping bush 346 engage in these cut out portions 350. Further, the damping bush 336 has an annular groove 356 at its outer surface. In the embodiment example, four cam-like projections 358 extend from the base of the annular groove 356. As shown in FIG. 4, the damping bush 346 sits in the recess 342 of the pot base 330. For this purpose, the recess 342 has grooves or channels 360 associated with the cam-shaped projections 358 of the damping bush 346 so as to ensure that the damping bush 346 is held in the base 330 so as to be rigid with respect to torsion when the annular edge 362 of the recess 342 sits in the annular groove 356 of the damping bush 346. In addition to this rigid engagement of the damping bush 346 with respect to torsion, cam-like projections 358 also provide for a damping of torsional vibrations occurring during the operation of the electric motor which are also minimized significantly by the axial projections 352 of the damping bush 346 engaging in the cut out portions 350 of the sleeve 336 which are open at the edge. FIG. 1 also shows that the end of the sleeve 336 remote of the flange projects out of the damping bush 346.

Figure 16A:
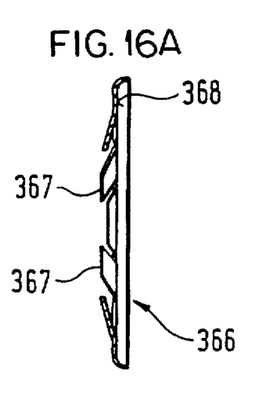
FIG. 16 shows a top view and a side view of a retaining washer according to FIG. 4 in enlarged scale.
Figure 16B:
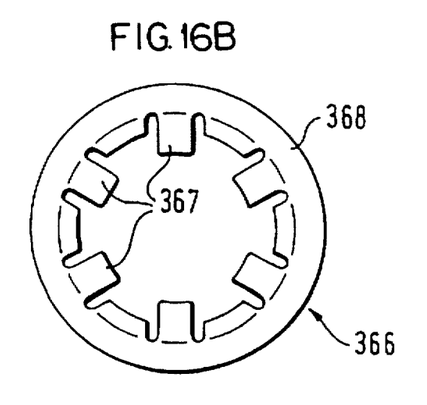
Figure 17:
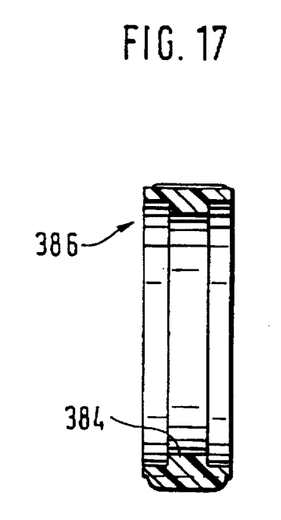
FIG. 17 shows a section through a damping ring along line XVII—XVII in FIG. 18.
Figure 18:
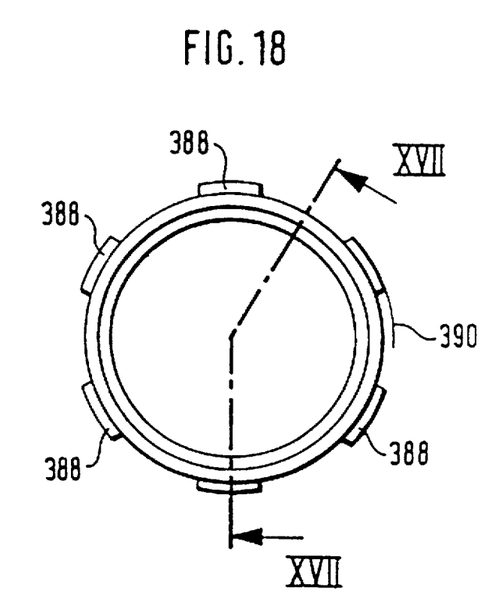
FIG. 18 shows a top view of a damping ring shown in FIG. 4 in enlarged scale.

An annular notch 364 receiving a retaining disk or washer 366 shown in FIG. 16 is arranged at the outer surface area of the sleeve 336. The retaining washer 366 is supported at the annular notch 364 by resilient tabs 367 so as to be pretensioned [Translator's Note: This sentence is garbled in the original German] and accordingly contacts the end face 370 of the damping bush 346 with its annular surface 368. In this way, the electric motor 312 is connected with the holding pot 316 in the axial direction. The construction, shape and arrangement of the holding pot, damping bush, sleeve and retaining washer 366 provide for a correct support and fastening of the motor in the axial and radial directions. Moreover, tangential vibrations which are particularly undesirable because of the intensive noise generated by them are damped. Pins 337 arranged at the sleeve 336 serve to position the sleeve at the end face of the bearing bracket 322.

Figure 13:
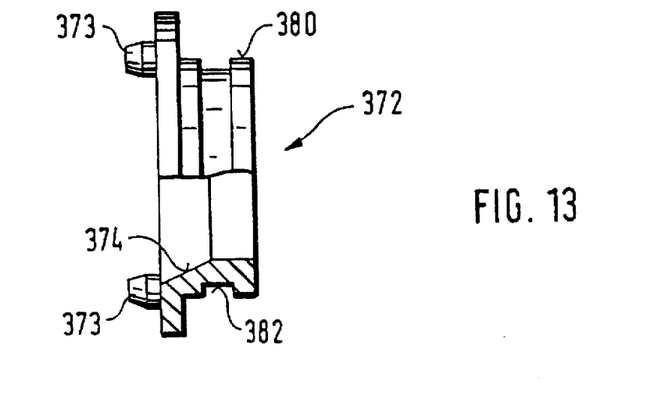
FIG. 13 shows a partial section along line XIII—XIII through a centering ring arranged in a supporting cup associated with the holding device according to FIG. 4 in enlarged scale.
Figure 14:
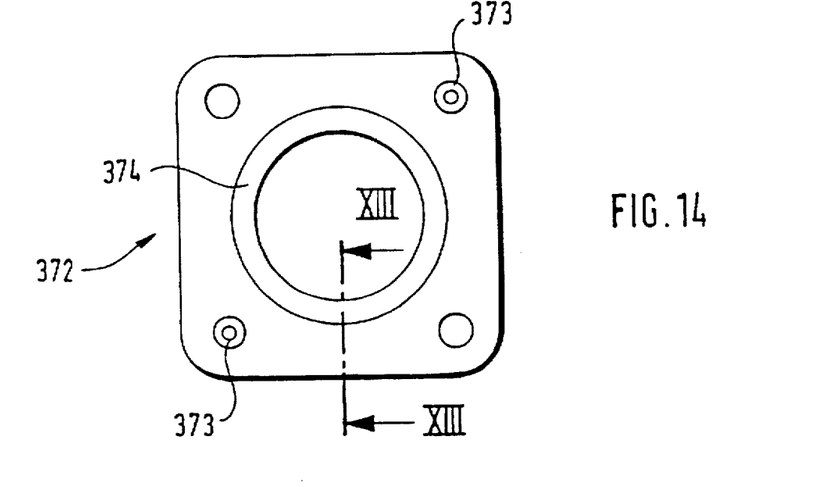
FIG. 14 shows a bottom view of the centering ring.
Figure 15:
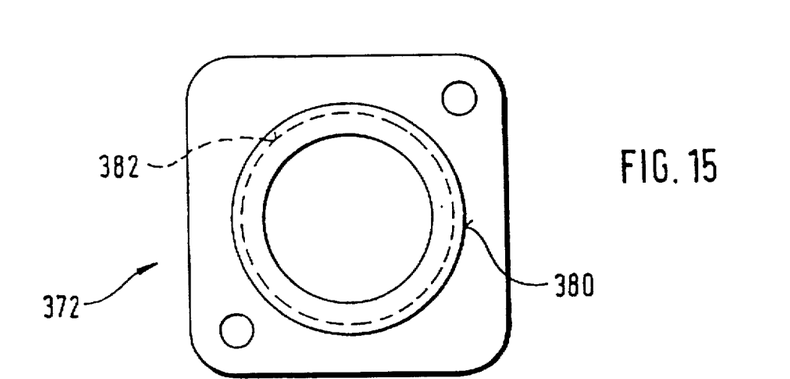
FIG. 15 shows a top view of the centering ring.

In addition to the holding arrangement of the electric motor described above, this electric motor is also supported in the supporting cup 318 at its end on the fan wheel side. For this purpose, at the end face 333 of the bearing bracket 324, the electric motor 312 has a bulge 370 in the shape of a truncated cone. A ring 372 is associated with the bulge 370 and receives the latter in a correspondingly conical receiving bore hole 374 of the ring 372 (FIG. 13). The ring 372 is also rigidly connected with the end face 333 of the bearing bracket 324, although it essentially belongs to the cup base 378. The ring 372 is arranged in an opening 376 of the cup base 378. The opening of the cup base has a circular edge. Its diameter is greater than the outer diameter of the ring 372 which has an annular groove 382 at the outer surface area 380 of the outer diameter. An annular projection 384 of a damping ring 386 engages in this annular groove 382 when the damping ring 386 is arranged on the ring 372. In the embodiment example, six supporting projections 388 are arranged at the circumference of the damping ring and contact the inner surface area of the opening 376 when the ring 372 is installed and provided with the damping ring 386. For this purpose, a theoretical circumference 390 circumscribing the projecting ends of the supporting projections 388 is adapted to the opening 376 in such a way that the supporting projections 388 are compressed only slightly. Pins 373 arranged at the ring 372 serve to position the ring at the end face 333 of the bearing bracket 324.

We claim:

1. An electric motor assembly, comprising an electric motor having a motor armature and a motor shaft, a tubular housing portion enclosing said motor armature, bearings supporting said motor shaft, and supports arranged at end sides of said housing portion for supporting said bearings of said motor shaft; a holding device arranged for receiving said electric motor; and resilient damping members arranged between said holding device and said motor housing, said holding device having inner walls facing said electric motor while said housing portion has outer walls facing said holding device, said damping members being located between and supported at said inner walls of said holding device and said outer walls of said housing portion and arranged at a distance from one another in the direction of a rotational axis of said electric motor, said supports including a retaining pipe and bearing brackets fastened to said retaining pipe, said holding device having a holding pot which is rigidly connected with a wall of an air guidance duct in which said holding device partially extends, and also having a base which forms one wall of said holding device, said holding device having another wall formed as a base of a supporting cup, said electric motor being supported at one of said bases in the direction of said rotational axis of said motor as well as radially to said rotational axis, and is also supported in another of said bases only in a radial direction.

2. An electric motor assembly, comprising an electric motor having a motor armature and a motor shaft, a tubular housing portion enclosing said motor armature, bearings supporting said motor shaft, and supports arranged at end sides of said housing portion for supporting said bearings of said motor shaft; a holding device arranged for receiving said electric motor; and resilient damping members arranged between said holding device and said motor housing, said holding device having inner walls facing said electric motor while said housing portion has outer walls facing said holding device, said damping members being located between and supported at said inner walls of said holding device and said outer walls of said housing portion and arranged at a distance from one another in the direction of a rotational axis of said electric motor, said supports including a retaining pipe and bearing brackets fastened to said retaining pipe, said holding device having a holding pot which is rigidly connected with a wall of an air guidance duct in which said holding device partially extends, and also having a base which forms one wall of said holding device, said holding device having another wall formed as a base of a supporting cup, said electric motor being formed as a fan motor having a fan wheel and penetrates a bearing bracket with a prolongation of said shaft so as to project into the air guidance duct, said prolongation supporting said fan wheel, said base of said supporting cup having a receptacle, one of said bearing brackets having a bulge received in said receptacle, said supporting cup engaging over said bearing bracket, and said bulge having a shape of a truncated cone.

3. An electric motor assembly as defined in claim 2, wherein said base of said supporting cup has an opening, said receptacle being formed as a central bore hole of a centering ring which is arranged in said opening of said base of said supporting cup.

4. An electric motor assembly as defined in claim 3; and further comprising a damping ring composed of resilient material and arranged between said centering ring and an edge of said opening.

5. An electric motor assembly as defined in claim 4, wherein said damping ring has an inner surface area provided with an annular projection, said centering ring having an outer surface area provided with an annular groove which receives said annular projection.

6. An electric motor assembly as defined in claim 4, wherein said damping ring has an outer surface area provided with a plurality of supporting projections which are arranged at a distance from one another in a circumferential direction, said supporting projections being formed so that a circumference circumscribing said supporting projections is adapted to a diameter of said circular opening.

7. An electric motor assembly as defined in claim 3, wherein said centering ring is fastened to one of said bearing brackets.

8. An electric motor assembly, comprising an electric motor having a motor armature and a motor shaft, a tubular housing portion enclosing said motor armature, bearings supporting said motor shaft, and supports arranged at end sides of said housing portion for supporting said bearings of said motor shaft; a holding device arranged for receiving said electric motor; and resilient damping members arranged between said holding device and said motor housing, said holding device having inner walls facing said electric motor while said housing portion has outer walls facing said holding device, said damping members being located between and supported at said inner walls of said holding device and said outer walls of said housing portion and arranged at a distance from one another in the direction of a rotational axis of said electric motor, said supports including a retaining pipe and bearing brackets fastened to said retaining pipe, said holding device having a holding pot which is rigidly connected with a wall of an air guidance duct in which said holding device partially extends, and also having a base which forms one wall of said holding device, said holding device having another wall formed as a base of a supporting cup, said holding part engaging over one of said bearing brackets and said base of said holding part is provided with a depression, said one bearing bracket having a protuberance shaped as a truncated cone and received in said depression.

9. An electric motor assembly as defined in claim 8, wherein said electric motor has a commutator, said holding part engaging over said at least one bearing bracket at a commutator side.

10. An electric motor assembly as defined in claim 8, wherein said base of said holding pot has a recess, said depression being formed as a central bore hole of a centering sleeve arranged in said recess.

11. An electric motor assembly as defined in claim 10; and further comprising a damping bush composed of a resilient material and arranged between said centering sleeve and an annular edge of said recess.

12. An electric motor assembly as defined in claim 11, wherein said damping bush has an outer surface area provided with an annular groove, said annular edge of said recess engaging in said annular groove.

13. An electric motor assembly as defined in claim 12, wherein said annular groove is provided with at least one cam-like projection, said annular edge having a channel associated with said projection.

14. An electric motor assembly as defined in claim 11, wherein said centering sleeve has an annular edge arranged in an interior of said holding pot, said damping bush having a wall located opposite to said annular flange and having axial projections, said annular wall having cut out portions in which said axial projections of said annular wall engage.

15. An electric motor assembly as defined in claim 14, wherein said centering sleeve has an end which is remote from said flange and projects out of said damping bush, said end being provided with an annular notch; and further comprising a resilient washer received in said annular notch.

16. An electric motor assembly, comprising an electric motor having a motor armature and a motor shaft, a tubular housing portion enclosing said motor armature, bearings supporting said motor shaft, and supports arranged at end sides of said housing portion for supporting said bearing of said motor shaft; a holding device arranged for receiving said electric motor; and resilient damping members arranged between said holding device and said housing portion said holding device having inner walls facing said electric motor while said housing portion has outer walls facing said holding device, said damping members being located between and supported at said inner walls of said holding device and said outer walls of said housing portion and arranged at a distance from one another in a direction of a rotational axis of said electric motor, said supports including a retaining pipe and bearing brackets fastened to said retaining pipe, said holding device having a holding pot which is rigidly connected with a wall of an air guidance duct in which said holding device partially extends and also having a base which forms one wall of said holding device, said holding device having another wall formed as a base of a supporting cup.

17. An electric motor assembly, comprising an electric motor having a motor armature and a motor shaft, a tubular housing portion enclosing said motor armature, bearings supported said motor shaft, and supports arranged at ends sides of said housing portion for supporting said bearings of said motor shaft; a holding device arranged for receiving said electric motor; and resilient damping members arranged between said holding device and said motor housing, said holding device having inner walls facing said electric motor while said housing portion has outer walls facing said holding device, said damping members located between and supported at said inner walls of said holding device and said outer walls of said housing portion and arranged at a distance from one another in the direction of rotational axis of said electric motor, said holding device having walls which extend parallel to said supports of said electric motor, at least one of said damping members being arranged between each support and a respective one of said walls which is parallel to said support, said at least one damping member being formed substantially as a ring having one end which abuts against said holding device and another end side which abuts against said housing portion, at least one of said damping members supporting an element selected from the group consisting of at least one of said supports and at least one of said bearings, axially on said holding device.

18. An electrical motor as defined in claim 17, wherein said each of said supports has a conical bulge while each of said walls which extend parallel to said supports has a conical recess, said at least one damping member being arranged between said conical bulge and said conical recess.

19. An electrical motor as defined in claim 17, wherein said at least one damping member has an angular flange extending radially outwardly of said conical bulge and said conical recess.

* * * * *